(12) United States Patent
Wallace

(10) Patent No.: US 8,761,537 B2
(45) Date of Patent: Jun. 24, 2014

(54) ADAPTIVE EDGE ENHANCEMENT

(75) Inventor: Bradley Arthur Wallace, Austin, TX (US)

(73) Assignee: ViXS Systems, Inc., Toronto, Ontario (CA)

(*) Notice: Subject to any disclaimer, the term of this patent is extended or adjusted under 35 U.S.C. 154(b) by 361 days.

(21) Appl. No.: 13/117,328

(22) Filed: May 27, 2011

(65) Prior Publication Data

US 2012/0301046 A1 Nov. 29, 2012

(51) Int. Cl.
*G06K 9/40* (2006.01)

(52) U.S. Cl.
USPC ........... 382/266; 382/162; 382/167; 382/260; 382/261; 382/262; 382/263; 382/264

(58) Field of Classification Search
USPC .......................... 382/162, 167, 260–264, 266
See application file for complete search history.

(56) References Cited

U.S. PATENT DOCUMENTS

| | | | | | |
|---|---|---|---|---|---|
| 4,223,339 | A | * | 9/1980 | Lagoni et al. | 348/628 |
| 4,223,340 | A | * | 9/1980 | Bingham et al. | 348/628 |
| 4,245,237 | A | * | 1/1981 | Lagoni | 348/628 |
| 5,012,329 | A | * | 4/1991 | Lang et al. | 348/667 |
| 5,102,329 | A | * | 4/1992 | Lifshits | 431/354 |
| 5,936,682 | A | * | 8/1999 | Thomas et al. | 348/625 |
| 6,008,862 | A | * | 12/1999 | Bellers | 348/631 |
| 7,406,208 | B2 | * | 7/2008 | Chiang | 382/266 |
| 8,139,890 | B2 | * | 3/2012 | Huang | 382/266 |
| 2002/0145678 | A1 | * | 10/2002 | Suzuki et al. | 348/675 |
| 2003/0206245 | A1 | * | 11/2003 | Lin et al. | 348/631 |
| 2004/0125411 | A1 | * | 7/2004 | Tonami et al. | 358/2.1 |
| 2005/0008251 | A1 | * | 1/2005 | Chiang | 382/266 |
| 2006/0285767 | A1 | * | 12/2006 | Ali | 382/265 |
| 2007/0154107 | A1 | * | 7/2007 | Jang | 382/266 |
| 2007/0200957 | A1 | * | 8/2007 | Sim | 348/631 |
| 2009/0103804 | A1 | * | 4/2009 | Lin | 382/167 |
| 2009/0180706 | A1 | * | 7/2009 | Huang | 382/266 |
| 2010/0177249 | A1 | * | 7/2010 | Ali | 348/625 |
| 2011/0141368 | A1 | * | 6/2011 | Wallace et al. | 348/606 |
| 2012/0301046 | A1 | * | 11/2012 | Wallace | 382/263 |

FOREIGN PATENT DOCUMENTS

EP 2259580 A1 8/2010

OTHER PUBLICATIONS

Adaptive Rate—supression, Jinsoo Cho, IEEE, 0098-3063, 2006, pp. 1398-1402.*
Color transient—filtering, Cho et al., IEEE, 0098-3063, 2008, pp. 1873-1879.*

(Continued)

*Primary Examiner* — Jayesh A Patel
(74) *Attorney, Agent, or Firm* — Abel Law Group, LLP

(57) ABSTRACT

In at least one embodiment of the invention, an apparatus for adaptive edge enhancement of a video signal includes a transient improvement module. The transient improvement module is configured to generate a first adjusted pixel value based on a window of pixel values for pixels surrounding a pixel-of-interest initially having an input pixel value. The apparatus includes an adaptive peaking module configured to generate a second adjusted pixel value based on the first adjusted pixel value and the input pixel value. In at least one embodiment of the apparatus, the adaptive peaking module comprises a high-pass filter configured to generate a pixel adjustment based on the first adjusted pixel value. In at least one embodiment of the apparatus, the adaptive peaking module further comprises a gain path configured to apply at least one adaptive gain value to the pixel adjustment to generate an adaptive adjustment value.

28 Claims, 8 Drawing Sheets

(56) References Cited

OTHER PUBLICATIONS

Cho, Jinsoo, "Adaptively Rate-Controlled Shoot Suppression," IEEE Transactions on Consumer Electronics, vol. 52, No. 4, Nov. 2006, pp. 1398-1402.

Cho, Jinsoo and Bae, Jongwoo, "Edge-Adaptive Local Min/Max Nonlinear Filter-Based Shoot Suppression," IEEE Transactions on Consumer Electronics, vol. 52, No. 3, Aug. 2006, pp. 1107-1111.

Cho, Jinsoo and Bae, Jongwoo, "Color Transient Improvement with Transient Detection and Variable Length Nonlinear Filtering," IEEE Transactions on Consumer Electronics, vol. 54, No. 4, Nov. 2008, pp. 1873-1879.

U.S. Appl. No. 12/639,353, filed Dec. 16, 2009, entitled, "Adaptive Edge Enhancement Using Directional Components from Non-Linear Filtering," naming inventors Bradley Arthur Wallace and James C. Lynch.

European Search Report, Application No. 12171227.7, dated Jan. 21, 2013, 6 pages.

* cited by examiner

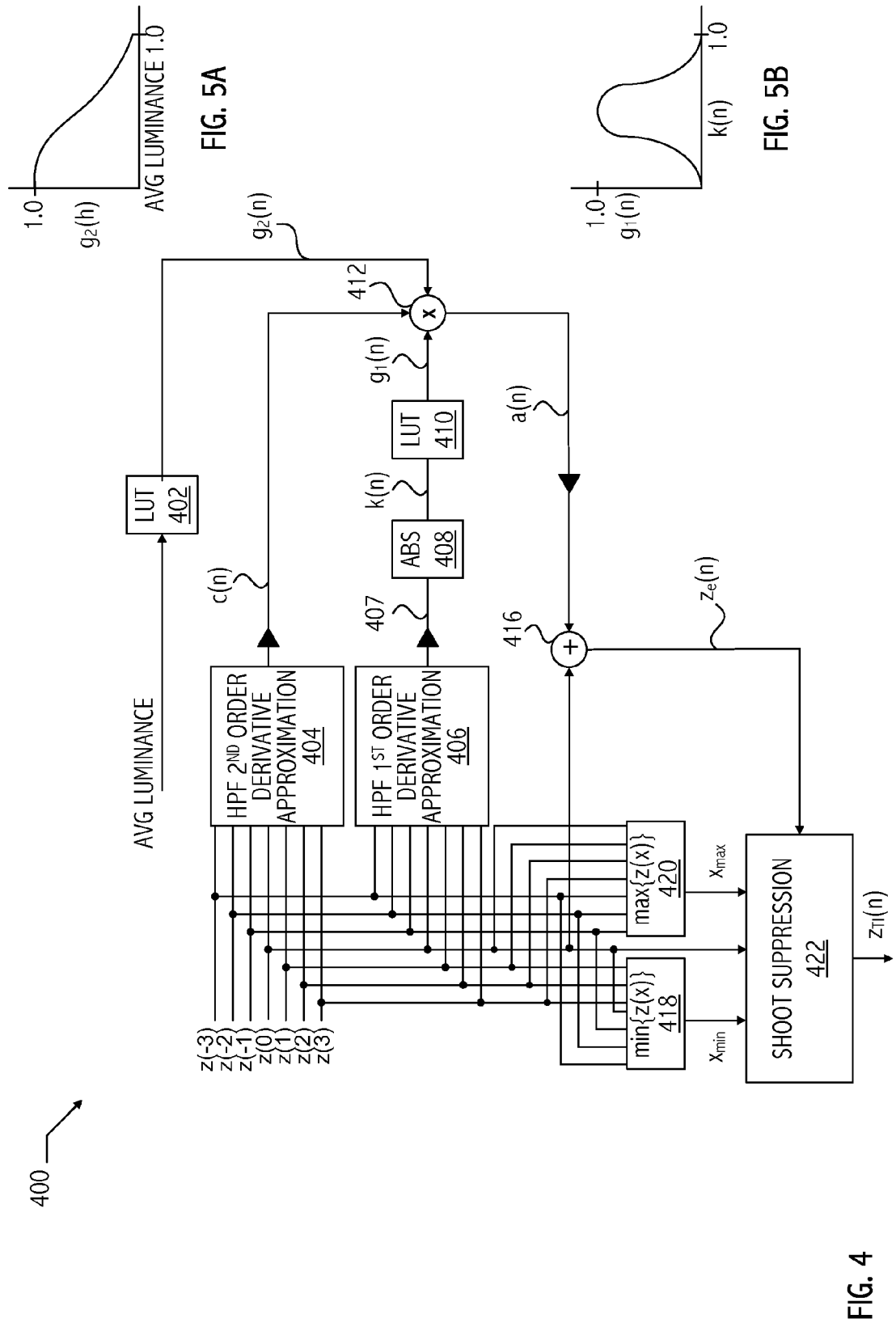

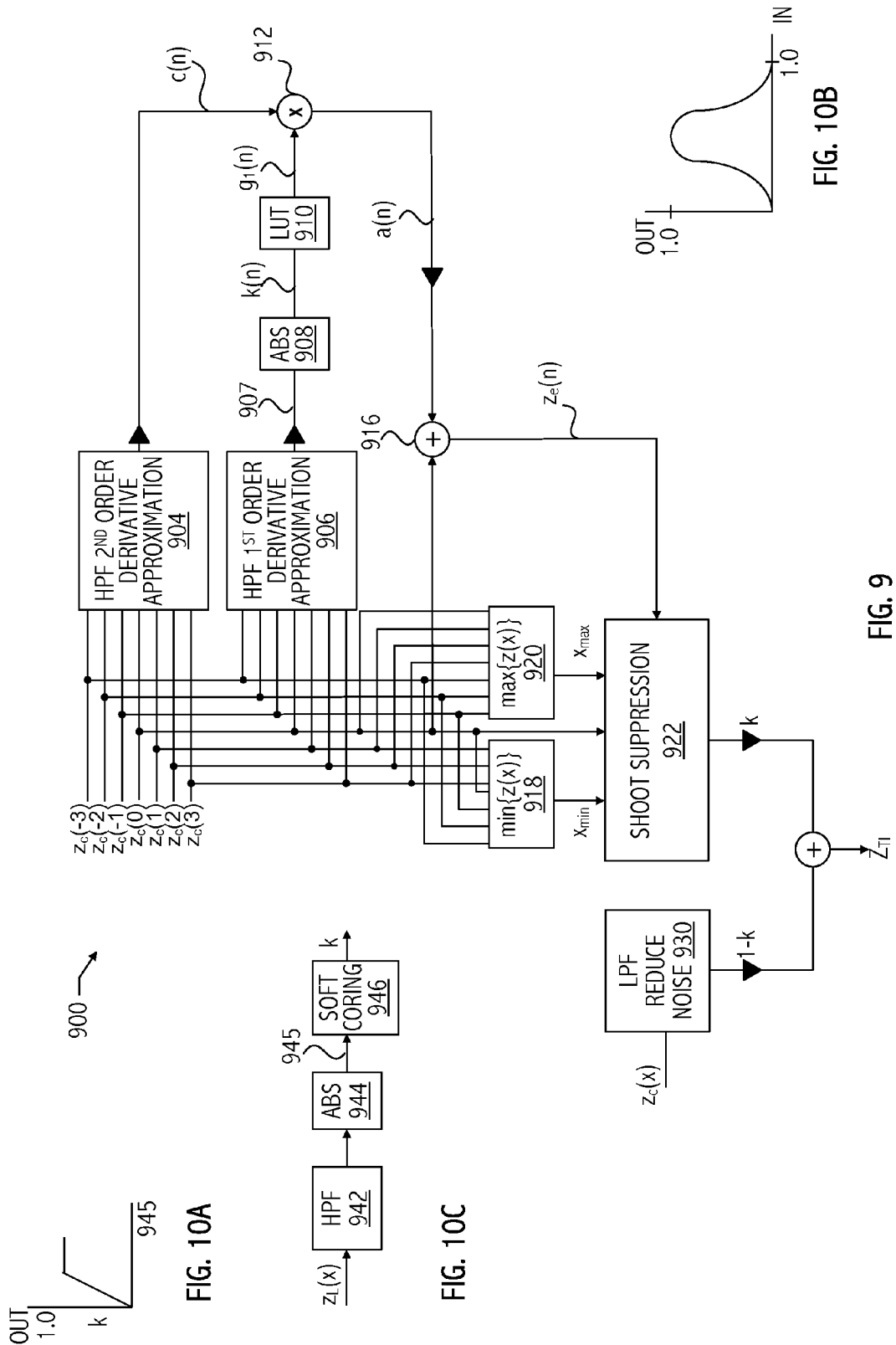

US 8,761,537 B2

ADAPTIVE EDGE ENHANCEMENT

BACKGROUND

1. Field of the Invention

This application is related to video processing systems and more particularly to edge enhancement of video signals.

2. Description of the Related Art

In general, image processing systems and video processing systems perform edge enhancement techniques to improve the apparent sharpness of an image or frame of a video signal (i.e., video frame, video image), hereinafter referred to as an "image." Typical edge enhancement filters (e.g., transient improvement filters) are designed to improve the edge transition of luma of the image or video frame. For example, a edge enhancement filter identifies sharp edge boundaries in the frame, e.g., an edge between a subject and a background of a contrasting color, and increases the contrast in the area immediately around the edge. However, the edge enhancement filter may overshoot or undershoot, creating visually unnatural or noisy adjusted edges.

SUMMARY

In at least one embodiment of the invention, an apparatus for adaptive edge enhancement of a video signal includes a transient improvement module. The transient improvement module is configured to generate a first adjusted pixel value based on a window of pixel values for pixels surrounding a pixel-of-interest initially having an input pixel value. The apparatus includes an adaptive peaking module configured to generate a second adjusted pixel value based on the first adjusted pixel value and the input pixel value. In at least one embodiment of the apparatus, the adaptive peaking module comprises a high-pass filter configured to generate a pixel adjustment based on the first adjusted pixel value. In at least one embodiment of the apparatus, the adaptive peaking module further comprises a gain path configured to apply at least one adaptive gain value to the pixel adjustment to generate an adaptive adjustment value.

In at least one embodiment of the invention, a method for edge-enhancement of a video signal includes generating a transient-adjusted pixel value for a pixel-of-interest based on a window of pixel values for pixels surrounding the pixel-of-interest. The pixel-of-interest initially has an input pixel value. The method includes generating an output adjusted pixel value for the pixel-of-interest based on at least one adaptive gain value, a high-pass filter of the window of pixel values, and the transient-adjusted pixel value.

In at least one embodiment of the invention, an apparatus for adaptive edge enhancement of a video signal includes a first chrominance transient adjustment module configured to generate a first adjusted chrominance value based on a window of chrominance values of pixels surrounding a pixel-of-interest having an input chrominance value and an input luminance value. The apparatus includes a first control module configured to generate an output adjusted chrominance value for the pixel-of-interest based on the first adjusted chrominance value, the input chrominance value, and the input luminance value.

BRIEF DESCRIPTION OF THE DRAWINGS

The present invention may be better understood, and its numerous objects, features, and advantages made apparent to those skilled in the art by referencing the accompanying drawings.

FIG. 4 illustrates a functional block diagram of a luma transient improvement module 306 of FIG. 3, consistent with at least one embodiment of the invention.

FIGS. 5A and 5B illustrate exemplary functions implemented by lookup tables 402 and 410, respectively, of FIG. 4, consistent with at least one embodiment of the invention.

FIG. 9 illustrates a functional block diagram of a chroma component transient improvement module 504 of FIG. 8, consistent with at least one embodiment of the invention.

FIGS. 10A and 10B illustrate exemplary functions implemented by soft coring module 946 and look-up-table 910, respectively, of FIG. 6, consistent with at least one embodiment of the invention.

FIG. 10C illustrates a control path for generating weighting factor k of FIG. 9, consistent with at least one embodiment of the invention.

The use of the same reference symbols in different drawings indicates similar or identical items.

DETAILED DESCRIPTION

Figure 1:
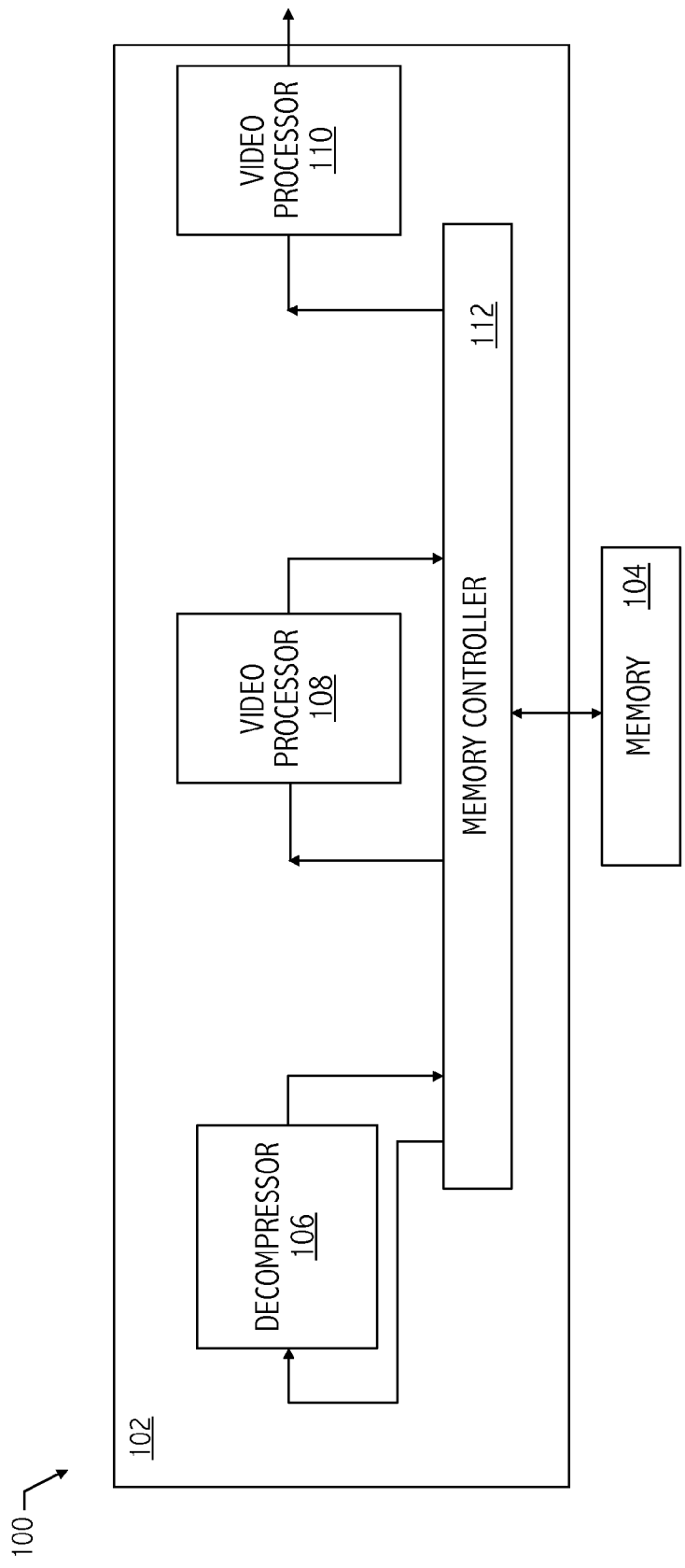
FIG. 1 illustrates a functional block diagram of an exemplary video processing system.

Referring to FIG. 1, an exemplary video system-on-a-chip (SOC) integrated circuit (e.g., video SOC 102) receives one or more streams of video data from an external source via memory 104. Video processors 108 and 110 retrieve the uncompressed video data from memory 104. Video processors 108 and 110 retrieve only portions of an individual frame of the video data at a time. Video processors 108 and 110 may include one or more of a frame rate converter, a display, a deinterlacer, a compositor, a scaler, an edge-enhancement module, a color manipulation module, a face or objection recognition module, a contrast enhancer, a superresolution scaler, a deblocker, a temporal and/or spatial noise reducer, other suitable video processing modules, or any combination thereof. Video processors 108 and 110 store processed, uncompressed video data back to memory 104 for subsequent use or provide processed video data directly to an on-chip buffer, directly to another video processor, or to an off-chip circuit (not shown).

Although decompressor 106 and video processors 108 and 110 are illustrated as being directly coupled to memory controller 112, in other embodiments of an SOC, decompressor 106 and video processors 108 and 110 are coupled to one or more shared memory buses. A typical memory 104 is a double data rate synchronous dynamic random access memory (i.e., DDR SDRAM memory or DDR memory). In at least one embodiment, memory 104 is a DDR memory compliant with a DDR SDRAM memory standard, DDR2 SDRAM memory standard, DDR3 SDRAM memory standard, other DDR SDRAM memory standard, or other suitable memory standard.

Referring to FIGS. 1 and 2, in at least one embodiment of video system 100, video processor 108 or 110 is an adaptive edge enhancement module (e.g., adaptive enhancement module 200) that performs edge enhancement techniques on an image to improve the apparent sharpness of the image. A particular pixel of an image typically represented by a luma (i.e. luminance) value (Y) and two chroma values (e.g., $C_B$ and $C_R$). As referred to herein, "a pixel value" refers to a luma value or a chroma component value, e.g., Y, $C_B$, or $C_R$ for a particular pixel of an image. For at least one composite video encoding system, the luma values represent brightness in an image (i.e., the black and white or achromatic portion of the image). The chroma signal conveys color information of the image separately from the luma signal. In general, chroma (i.e., chrominance) signal is typically represented by two color-difference components U=0.492×(B'−Y) (i.e., blue–luma) and V=0.877×(R'−Y) (i.e., red–luma). In a composite video signal, the U and V signals modulate a color subcarrier signal. The result is referred to as the chrominance signal. The phase and amplitude of the modulated chrominance signal correspond approximately to the hue and saturation of the color. In at least one embodiment of a composite video system, rather than use absolute values (e.g., B' and R') for blue and red components of the video signal, color difference components (e.g., $C_B$ and $C_R$, respectively) are used. In at least one embodiment, adaptive enhancement module 200 enhances both luma values and chroma values of an image. However, an adaptive enhancement module consistent with techniques described herein enhances luma values, $C_B$ chroma values, $C_R$ chroma values, or any combination thereof.

Figure 2A:
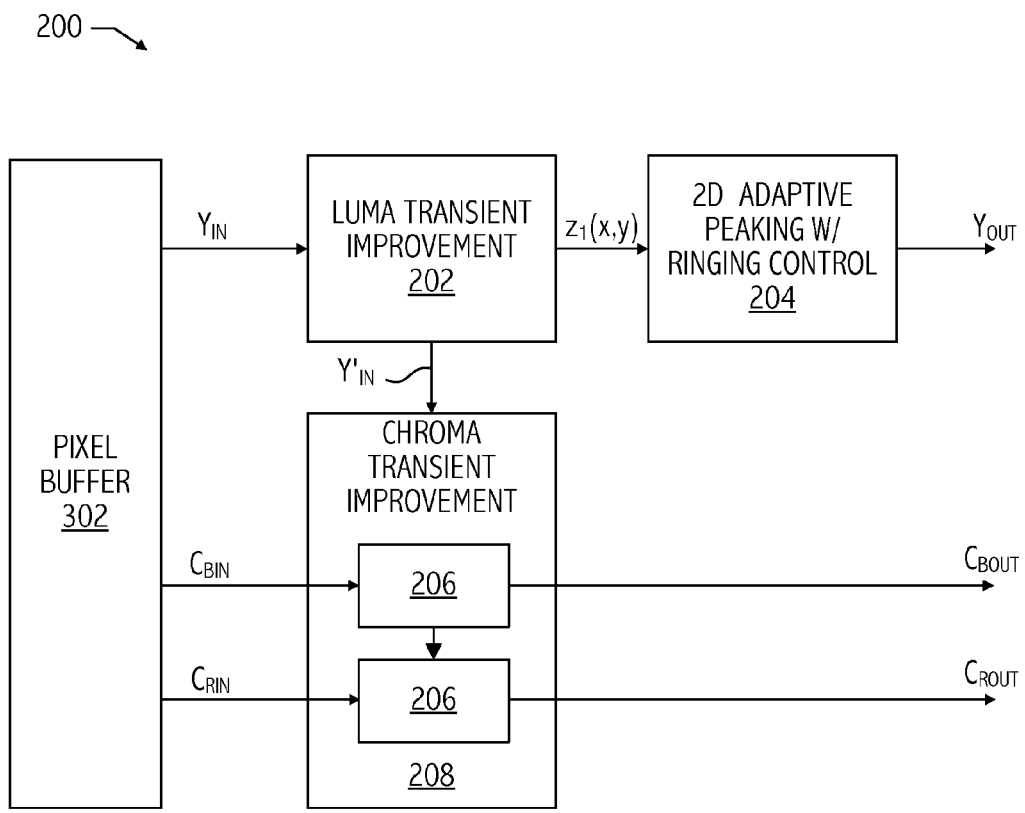
FIGS. 2A and 2B illustrate functional block diagrams of adaptive edge-enhancement video processing modules consistent with various embodiments of the invention.
Figure 2B:
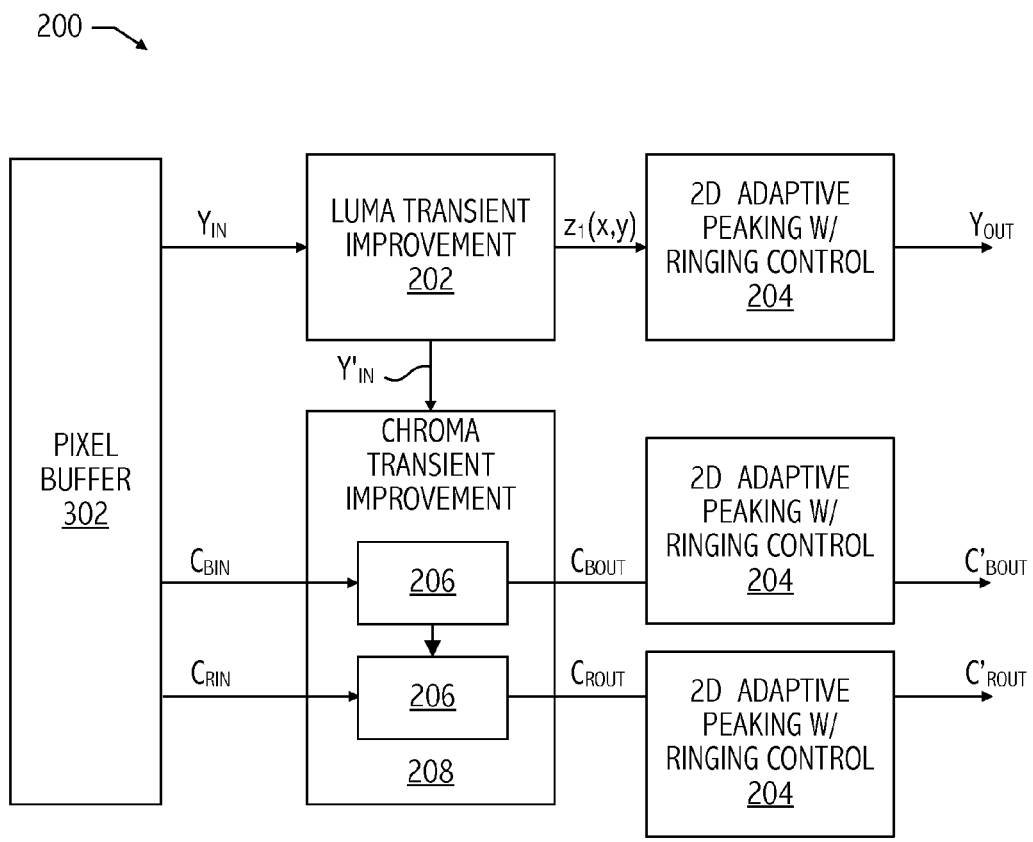

Referring to FIGS. 2A and 2B, in at least one embodiment of adaptive enhancement module 200, a transient improvement module (e.g., luma transient improvement module 202) performs edge-enhancement techniques on the luma values of an image (e.g., $Y_{IN}$) and generates an adjusted luma value (e.g., $z_1(x,y)$) for each luma value of the image. However, luma transient improvement module 202 introduces high frequencies into the luma of an image. An additional enhancement module (e.g., 2-D adaptive peaking with ringing control module 204) enhances those newly introduced high-frequency components of the luma of the image to generate output adjusted luma values for the image (e.g., $Y_{OUT}$). An additional transient improvement module (e.g., chroma transient improvement module 208) performs edge-enhancement techniques on each of the chroma components (e.g. $C_B$ and $C_R$) to generate output adjusted chroma component values (e.g. $C_{BOUT}$ and $C_{ROUT}$, respectively). In general, chroma components of an image are noisy signals due to high amounts of compression, making edges more difficult to detect in the chroma components of an image than in the corresponding luma of the image. Edges in a chroma component (e.g., $C_B$) alone are less likely to be detected by the human eye than edges in both luma and chroma of the image. Since edge-enhancement techniques may introduce noise artifacts, in at least one embodiment of adaptive enhancement module 200, the edge-enhancement techniques of chroma component transient improvement module 206 are controlled by a function of the associated luma values of the image (e.g., $Y_{IN}$). For example, chroma component values of an image are only adjusted by chroma component transient improvement module 206 when an edge is detected for the corresponding luma values. In at least one embodiment of adaptive edge enhancement module 200, edge enhancement of the chroma components is controlled by a function of a delayed version ($Y_{IN}'$) of the corresponding luma values of the image.

Figure 3:
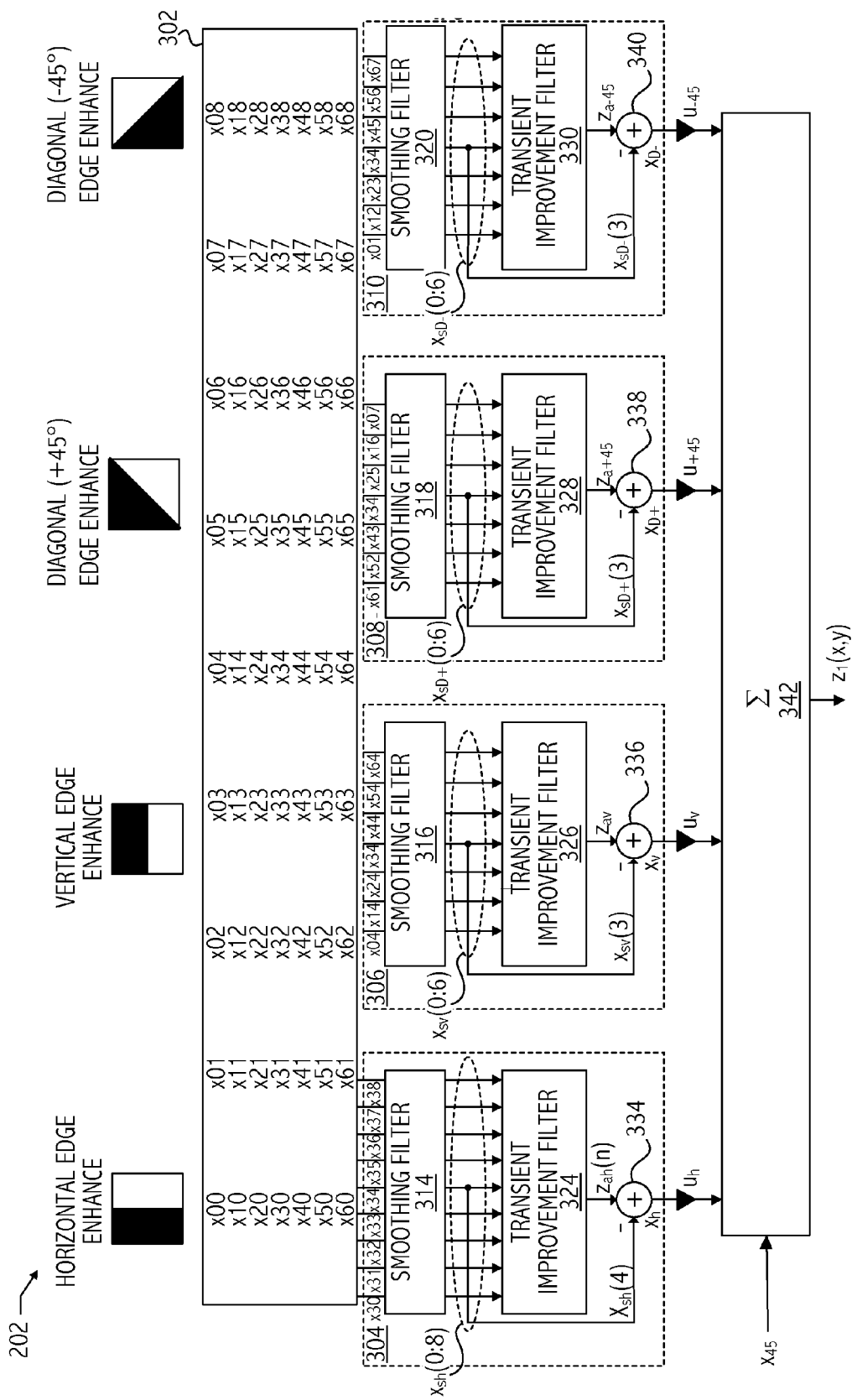
FIG. 3 illustrates a functional block diagram of a transient improvement module of FIGS. 2A and 2B, consistent with at least one embodiment of the invention.

Referring to FIG. 3, in at least one embodiment of luma transient improvement module 202, a window of pixel values (e.g., a window of luma values) is stored in buffer 302. Note that window 302 is asymmetric, having a number of rows that is less than the number of columns. The 7×9 window is exemplary only and other windows having different sizes and/or symmetry (e.g., 3×3, 4×4, 9×7) centered around a corresponding pixel-of-interest (i.e., a current pixel or input pixel) are consistent with the techniques described herein. The window of luma values includes those luma values of pixels that surround a pixel-of-interest, where the pixel-of-interest is centered in the window. The pixel data may be retrieved directly from memory 104 or may be stored in a frame buffer or other suitable buffer of video SOC 102.

In at least one embodiment of luma transient improvement module 202, each of four directional filter modules (e.g., horizontal edge enhance filter module 304, vertical edge enhance filter module 306, positive diagonal edge enhance filter module 308, and negative diagonal edge enhance filter module 310) determines a transient improvement value for a corresponding direction (e.g., horizontal, vertical, positive diagonal, and negative diagonal, respectively) by applying a two-dimensional, non-linear filter to a window of luma values associated with a pixel-of-interest. As referred to herein, an "improvement value" or "enhancement value" refers to an adjustment value that is intended to improve the visual perception of the image.

In at least one embodiment, each of the directional filter modules 304, 306, 308, and 310 includes a corresponding smoothing filter (e.g., smoothing filters 314, 316, 318, and 320) that generate corresponding smoothed pixel values (e.g., $x_{sh}(0:8)$, $x_{sv}(0:6)$, $x_{s+45}(0:6)$, $x_{s-45}(0:6)$, respectively) based on a linear filtering of luma values from the window centered around the pixel-of-interest. The smoothed pixel values have reduced transient noise along the edge to be improved. In at least one embodiment, the smoothing filter units each apply a filter matrix to those luma values that deemphasizes use of luma information in the same orientation or direction-of-interest. In at least one embodiment of luma transient improvement module 202, smoothing filters 314, 316, 318, and 320 are 3×3 filters that output three collinear values. Exemplary filter techniques for horizontal, vertical, positive diagonal, and negative diagonal directions for a 3×3 pixel window are described in U.S. pat. application Ser. No. 12/639,353, filed on Dec. 16, 2009, naming Bradley Arthur Wallace and James C. Lynch as inventors, which application is hereby incorporated by reference. Those teachings may be extended to a 7×9 window centered around a pixel-of-interest having a pixel-of-interest located at row 3, column 4 of the pixel window (i.e., $x_{34}$).

In at least one embodiment of luma transient improvement module 202, smoothing filter 314 is a 7×9 filter that outputs nine smoothed, collinear values and smoothing filters 316, 318, and 320 are 7×9 filters that output seven smoothed, collinear values. For example, if the window of luma values is $$w = \begin{bmatrix} w_{00} & \cdots & w_{08} \\ \vdots & \ddots & \vdots \\ w_{60} & \cdots & w_{68} \end{bmatrix},$$

a filtering operation on the window, w, can be computed as $$x = \Sigma_{i,j} H_{i,j} w_{i,j},$$

where $H_{i,j}$ is a two-dimensional filter kernel. Since the window of available pixels is limited (e.g., to 7 pixels by 9 pixels), and filter 314 needs to provide 9 collinear output pixels, $x_k$, and filters 316, 318, and 320 need to provide 7 collinear output pixels, $x_k$, the filter kernel is limited for each value of k. For the horizontal orientation, $x_k$, for k=−4 to 4, are used as inputs to the transient improvement block. However, since $$x_k = \Sigma_{i,j} H_{i,j} w_{i,j+k},$$

and if matrix $H_{7 \times 9}$ has non-zero entries for all i,j, then the window, w, must be larger in order to index element j+k. For example, j+k=8+4=12, when evaluating $x_4$. Thus, a different filter kernel for each value of k may be used (e.g., kernels, $H^k$). For a particular improvement orientation, the pixel values are filtered in an orthogonal direction. In at least one embodiment, filter 316, which filters in a vertical direction, uses distinct filter kernels for each value of k. For example, the following kernel $H^4$ is used when evaluating $x_4$ for the horizontal direction:

$$H^4 = \begin{bmatrix} 0 & 0 & 0 & 0 & h_{04} & 0 & 0 & 0 & 0 \\ 0 & 0 & 0 & 0 & h_{14} & 0 & 0 & 0 & 0 \\ 0 & 0 & 0 & 0 & h_{24} & 0 & 0 & 0 & 0 \\ 0 & 0 & 0 & 0 & h_{34} & 0 & 0 & 0 & 0 \\ 0 & 0 & 0 & 0 & h_{44} & 0 & 0 & 0 & 0 \\ 0 & 0 & 0 & 0 & h_{54} & 0 & 0 & 0 & 0 \\ 0 & 0 & 0 & 0 & h_{64} & 0 & 0 & 0 & 0 \end{bmatrix}.$$

In at least one embodiment of luma transient improvement module 202, simplified filter kernels that filter pixel values in a direction orthogonal to the improvement orientation include at most three non-zero taps. For filter 314, an exemplary filter kernel is $$H^4 = \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & h_{24} & 0 & 0 & 0 & 0 \\ 0 & 0 & 0 & 0 & h_{34} & 0 & 0 & 0 & 0 \\ 0 & 0 & 0 & 0 & h_{44} & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix},$$

for filter 316, an exemplary filter kernel is $$H^4 = \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & h_{33} & h_{34} & h_{35} & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix},$$

for filter 318, an exemplary filter kernel is $$H^4 = \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & h_{25} & 0 & 0 & 0 \\ 0 & 0 & 0 & 0 & h_{34} & 0 & 0 & 0 & 0 \\ 0 & 0 & 0 & h_{43} & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix},$$

and for filter 320, an exemplary filter kernel is $$H^4 = \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & h_{23} & 0 & 0 & 0 & 0 & 0 \\ 0 & 0 & 0 & 0 & h_{34} & 0 & 0 & 0 & 0 \\ 0 & 0 & 0 & 0 & 0 & h_{45} & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}.$$

Exemplary coefficients for the [$h_{24}$ $h_{34}$ $h_{44}$] of filter 316, [$h_{25}$ $h_{34}$ $h_{43}$] of filter 318, and [$h_{23}$ $h_{34}$ $h_{45}$] of filter 320 are [0.25 0.5 0.25], although other filter coefficients may be used.

In at least one embodiment of a smoothing filter 314, 316, 318, or 320, when the smoothing filter does not operate on a luma value of the corresponding collinear input vector, then the smoothing filter passes that unsmoothed luma value through to the corresponding subsequent transient improvement filter (e.g., transient improvement filter 324, 326, 328, or 330). In at least one embodiment of luma transient improvement module 202, each of the directional filter modules 304, 306, 308, and 310 is configured to generate a corresponding direction-specific transient-adjusted value ($z_a$) for the luma value of the pixel-of-interest in pixel window buffer 302 based on a non-linear filtering of corresponding smoothed pixel values ($x_{sh}(0:8)$, $x_{sv}(0:6)$, $x_{sD+}(0:6)$, $x_{sD-}(0:6)$). For example, transient improvement filter 324 of horizontal edge enhance filter module 304 generates a transient-adjusted value $z_{ah}$ in a horizontal direction based on a non-linear filtering of [z(−4), z(−3), z(−2), z(−1), z(0), z(1), z(2), z(3), z(4)], which corresponds to [$x_{sh}(0)$, $x_{sh}(1)$, $x_{sh}(2)$, $x_{sh}(3)$, $x_{sh}(4)$, $x_{sh}(5)$, $x_{sh}(6)$, $x_{sh}(7)$, $x_{sh}(8)$]; transient improvement filter 326 of vertical edge enhance filter module 306 generates a transient-adjusted value based on a non-linear filtering of the pixel window in a vertical direction based on a non-linear filtering of [z(−3), z(−2), z(−1), z(0), z(1), z(2), z(3)], which corresponds to [$x_{sv}(0)$, $x_{sv}(1)$, $x_{sv}(2)$, $x_{sv}(3)$, $x_{sv}(4)$, $x_{sv}(5)$, $x_{sv}(6)$]; transient improvement filter 328 of positive diagonal edge enhance filter module 308 generates a transient-adjusted value $z_{aD+}$ based on a non-linear filtering of the pixel window in a positive diagonal direction (e.g., +45 degrees) based on a non-linear filtering of [z(−3), z(−2), z(−1), z(0), z(1), z(2), z(3)], which corresponds to [$x_{sD+}(0)$, $x_{sD+}(1)$, $x_{sD+}(2)$, $x_{sD+}(3)$, $x_{sD+}(4)$, $x_{sD+}(5)$, $x_{sD+}(6)$]; transient improvement filter 330 of negative diagonal edge enhance filter module 310 generates a transient-adjusted value $z_{aD-}$ based on a non-linear filtering of the pixel window in a negative diagonal direction that is orthogonal to the positive diagonal direction (e.g., −45 degrees) based on a non-linear filtering of [z(−3), z(−2), z(−1), z(0), z(1), z(2), z(3)], which corresponds to [$x_{sD-}(0)$, $x_{sD-}(1)$, $x_{sD-}(2)$, $x_{sD-}(3)$, $x_{sD-}(4)$, $x_{sD-}(5)$, $x_{sD-}(6)$].

Each of the transient-improved pixel values $z_{ah}$, $z_{av}$, $z_{aD+}$, and $Z_{aD-}$, represents a sharpness-enhanced version of the pixel-of-interest in a corresponding one of the horizontal, vertical, positive diagonal, and negative diagonal directions. Summation modules 334, 336, 338, and 340 sum the corresponding transient-improved pixel values $z_{ah}$, $z_{av}$, $z_{ad+}$, and $z_{aD-}$ with a corresponding filtered version of the pixel-of-interest (i.e., $x_{sh}(4)$, $x_{sv}(3)$, $x_{sD+}(3)$, and $x_{sD-}(3)$), filtered with respect to the corresponding direction to isolate the direction-specific transient improvement value ($x_h$, $x_v$, $x_{D+}$ and $x_{D-}$). In at least one embodiment of luma transient improvement module 202, the direction-specific transient improvement values are gained to generate direction-specific transient improvement values $u_h$, $u_v$, $u_{+45}$, and $u_{-45}$, some or all of which are combined with the original pixel value initially associated with the pixel-of-interest (e.g., using summing module 342) to generate an adjusted pixel value for the pixel-of-interest ($z_1(x,y)$). Then, this process may be repeated for the next pixel.

Referring to FIG. 4, in at least one embodiment, a luma transient improvement module (e.g., a luma transient improvement filter 400), which may be transient improvement filter 326, transient improvement filter 328, or transient improvement filter 330, and which may be adapted for transient improvement filter 324 to receive as input z(−4), z(−3), z(−2), z(−1), z(0), z(1), z(2), z(3), z(4)), includes high-pass filter 404, which determines a second-order derivative approximation of collinear pixels in the pixel window in the corresponding direction. The resulting signal (e.g., signal c(n)) is indicative of the rate of change (i.e., increase or decrease) of the rate of change of the luminance values in the corresponding direction.

In at least one embodiment, luma transient improvement filter 400 includes high-pass filter 406 that determines a first-order derivative approximation of collinear pixels in the pixel window in the corresponding direction. The resulting scalar signal (e.g., signal 407) is indicative of the rate of change (i.e., the slope) of the luminance values that are collinear in the corresponding direction.

In at least one embodiment, luma transient improvement filter 400 generates a gain (e.g., $g_1(n)$) based on scalar 407, for example, by taking the absolute value of gain 407 and obtaining a corresponding gain value from a gain control module (e.g., a look-up-table in memory 410). In at least one embodiment, $g_1(n)$ is determined to increase high-frequency components without substantially enhancing noise. In at least one embodiment of luma transient improvement filter 400, look-up table 410 implements the function of FIG. 5B, which is an exemplary correlation between the input values for k(n) to corresponding output values for a gain value $g_1(n)$ output by gain control module 410. The exemplary relationship between the absolute value of the first-order derivative approximation value k(n) and the gain control value $g_1(n)$ has a relatively bell-shaped curve such that the gain control value $g_1(n)$ is relatively small when k(n) is relatively small or relatively large, and the gain control value $g_1(n)$ is relatively large where k(n) falls between these two extremes. This relationship is intended to deemphasize the transient improvement value through the gain control value $g_1(n)$ when no further sharpening of the pixel would be advantageous (e.g., in situations where there is potential for ringing and noise).

In at least one embodiment, luma transient improvement filter 400 uses the luminance values of z(−4), z(−3), z(−2), z(−1), z(0), z(1), z(2), z(3), z(4), to obtain an enhanced pixel when luma transient improvement filter 400 is transient improvement filter 324 of horizontal edge enhance filter module 304 and uses the luminance values of z(−3), z(−2), z(−1), z(0), z(1), z(2), z(3) to obtain an enhanced pixel when luma transient improvement filter 400 is one of the other transient improvement filters of FIG. 3. Then, luma transient improvement filter 400 obtains a corresponding gain value from a gain control module (e.g., a look-up-table 402). In at least one embodiment, $g_2(n)$ is determined to increase the strength of the signal if the average luminance is high (i.e., the pixel is dark) and decrease the strength if the average luminance is low (i.e., the pixel is light). In at least one embodiment of luma transient improvement filter 400, look-up table 402 implements the function of FIG. 5A, which is an exemplary correlation between the average luminance to corresponding values for gain value $g_2(n)$ output by gain control module 402. This relationship is intended to reduce or eliminate effects of overshoot or undershoot.

Gains $g_1(n)$ and $g_2(n)$ are applied to c(n), e.g., using multiplier 412, to generate a direction-specific transient improvement value for the corresponding direction (e.g., adjustment value a(n)). In at least one embodiment of luma transient improvement filter 400, a summing module (e.g., summer 416) sums adjustment value a(n) with the smoothed version of the luma value for the pixel-of-interest (e.g., z(0)) to generate a direction-specific enhanced luma value for the pixel-of-interest (e.g., $z(0)+a(n)=z_e(n)$). In at least one embodiment of luma transient improvement filter 400, $z_e(n)$ is output as the direction-specific edge-enhanced luma value for the pixel-of-interest. However, in at least one embodiment of luma transient improvement filter 400, shoot suppression module 422 further processes $z_e(n)$ to reduce effects of overshoot/undershoot.

In at least one embodiment, shoot suppression module 422 checks for overshoot and undershoot and dampens the direction-specific enhanced luma value in response to any detected overshoot or undershoot. In at least one embodiment of luma transient improvement filter 400, minimum generation module 418 determines a minimum value for the output direction-specific enhanced pixel value (e.g., $x_{min}$) and maximum generation module 420 determines a maximum value for the direction-specific enhanced pixel value (e.g., $x_{max}$). For example, minimum generation module 418 determines the minimum of z(−3), z(−2), z(−1), z(0), z(1), z(2), z(3) and maximum generation module 420 determines the maximum of z(−3), z(−2), z(−1), z(0), z(1), z(2), z(3). Shoot suppression module 422 uses $x_{min}$ to generate an undershoot-dampened enhanced pixel value (e.g., $D_U$). For example, in at least one embodiment of shoot suppression module 422, $D_U$ is based on weighted values of the minimum and the smoothed pixel value for the pixel-of-interest:

$$D_U = (cc_{maxmin} \times x_{min}) + (cc_{current} \times z(0)),$$

where $cc_{maxmin}$ is a clip coefficient for the minimum and maximum and $cc_{current}$ is a clip coefficient for the initial pixel value for the pixel-of-interest. Clip coefficients $cc_{maxmin}$ and $cc_{current}$ may be determined by simulation. In at least one embodiment, $cc_{maxmin}=0.75$ and $cc_{current}=0.25$. Similarly, in at least one embodiment, maximum generation module 420 generates a maximum, $x_{max}$, which is the maximum of the pixel values collinear with the pixel-of-interest in the particular direction (e.g., $x_{max}=\max\{z(-3), z(-2), z(-1), z(0), z(1), z(2), z(3)\}$). Shoot suppression module 422 uses $x_{max}$ to generate an overshoot-dampened enhanced pixel value (e.g., $D_O$). For example, in at least one embodiment of shoot suppression module 422, $D_O$ is based on weighted values of the maximum and the smoothed luma value for the pixel-of-interest:

$$D_O = (cc_{maxmin} \times x_{max}) + (cc_{current} \times z(0)).$$

In at least one embodiment of shoot suppression module 422, if the improved pixel value is less than the undershoot-dampened enhanced pixel value (i.e., $z_e(n)<D_U$), then shoot suppression module 422 provides $D_U$ as the output direction-specific enhanced pixel value, $z_{TI}(n)$. If the overshoot-dampened enhanced pixel value is greater than the overshoot-dampened maximum (i.e., $D_O<z_e(n)$), then shoot suppression module 422 provides $D_O$ as the output direction-specific enhanced pixel value $z_{TI}(n)$. Otherwise, shoot suppression module 422 provides $z_e(n)$ as the output direction-specific enhanced pixel value $z_{TI}(n)$.

In general, shoot suppression module 422 of luma transient improvement filter 400 has a non-linear effect and may introduce high-frequency components into the output stream of enhanced pixel values. Accordingly, in at least one embodiment of adaptive enhancement module 200 of FIGS. 2A and 2B, the output stream of enhanced pixel values ($z_1(x,y)$) are further processed e.g., by two-dimensional adaptive peaking with ringing control module 204, to enhance those high-frequency components in the resulting sharpened image.

Figure 6:
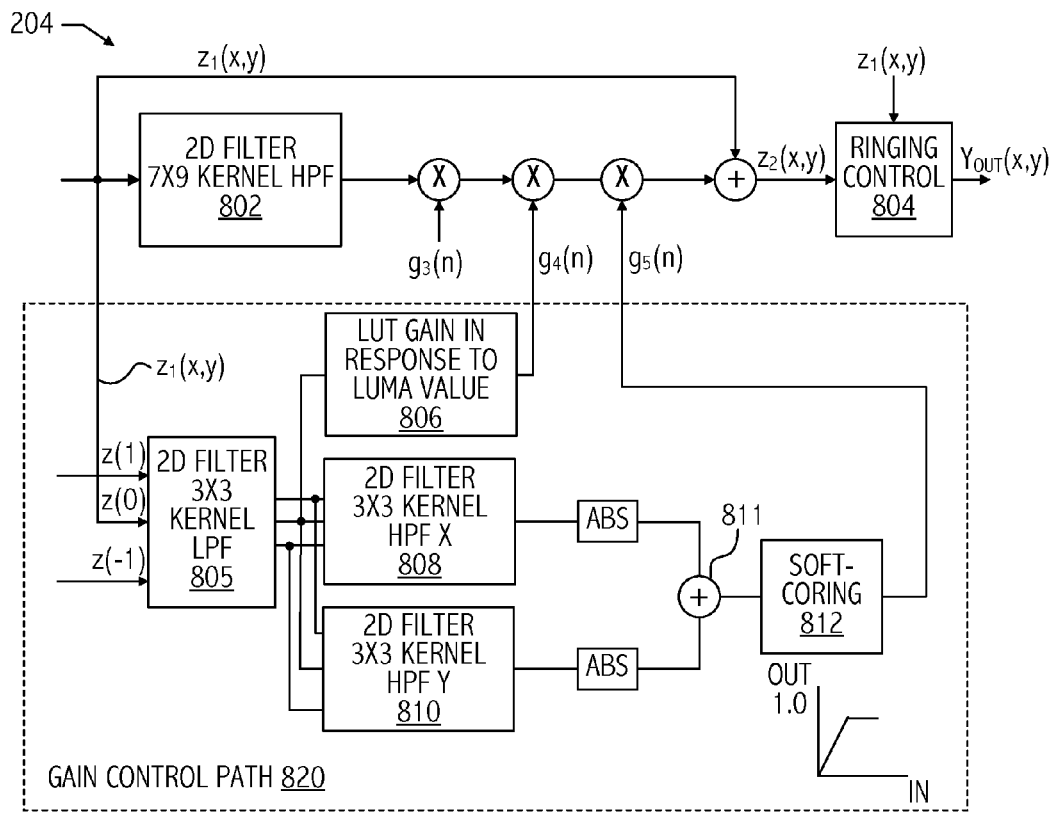
FIG. 6 illustrates a functional block diagram of the 2-D adaptive peaking with ringing control module 204 of FIGS. 2A and 2B consistent with at least one embodiment of the invention.
Figure 7:
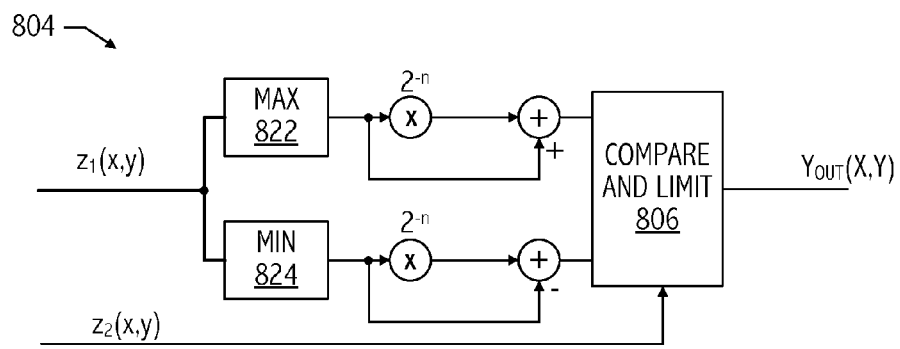
FIG. 7 illustrates a functional block diagram of ringing control module 804 of FIG. 6 consistent with at least one embodiment of the invention.

Referring to FIG. 6, in at least one embodiment of 2D adaptive peaking with ringing control module 204, the enhanced luma value for the pixel-of-interest (i.e., Y') is smoothed using a two-dimensional high-pass filter (e.g., 2D filter 802) and generates an adjustment value to enhance the high-frequency components in the output of luma transient improvement module 202. In at least one embodiment, 2D filter 802 has a 7×9 kernel corresponding to the filter window, consistent with techniques described above for 2-D filtering, and generates a single output value for a window of 7×9 pixels received as input. However, for other embodiments of adaptive enhancement module 200 that uses a different filter window size and/or symmetry, 2D filter 802 has a kernel corresponding to that filter window size and symmetry.

In at least one embodiment of 2D adaptive peaking with ringing control module 204, one or more gain values (e.g., $g_3(n)$, $g_4(n)$, and $g_5(n)$) are applied to the output of 2D filter 802. In at least one embodiment, a gain value (e.g., $g_3(n)$) is a user-specified gain control that allows adjustment to the level of sharpening. In at least one embodiment of video system 100, g3(n) is determined by a user of the video system 100 according to personal preference. In at least one embodiment of video system 100, g3(n) is predetermined by an equipment manufacturer based on image quality information. In at least one embodiment of video system 100, g3(n) has a value based on both a factor provided by a user and a predetermined factor provided by an equipment manufacturer. In at least one embodiment, one or more gain values (e.g., $g_4(n)$ and $g_5(n)$) are generated by gain control path 820, which low-pass filters the enhanced pixel values using a two-dimensional filter (e.g., 2D filter 805, which has a 3×3 kernel). The low-pass filtering is intended to prevent the adjusted signal from changing too quickly in favor of a more gradual change. Gain control path 820 obtains a corresponding gain value from a gain control module (e.g., look-up-table in memory 806). In at least one embodiment, $g_4(n)$ is determined to increase the edge enhancement for high values of average luminance (i.e., light pixels) and decrease the edge enhancement for low values of average luminance (i.e., dark pixels). In at least one embodiment of 2D adaptive peaking with ringing control module 204, $g_5(n)$ is determined to increase the edge enhancement based on detection of vertical edges and horizontal edges. The output of 2D filter 805 is high-pass filtered by two-dimensional filters (e.g., HPF X 808 and HPF Y 810) to detect horizontal and vertical edges. In at least one embodiment, HPF X 808 and HPF Y 810 each have a 3×3 kernel, however other suitable filters may be used. Summing module 811 combines the filter outputs to generate a gain value of at most one, by adding the absolute values of the filter outputs. Soft coring module 812 provides that combination as $g_5(n)$ when the combination is less than one and otherwise provides one as the gain value. Gain values $g_3(n)$, $g_4(n)$, and $g_5(n)$ are applied to the adjustment value output of 2D filter 802 and the resulting, gained adjustment value is summed with the enhanced luma value for the pixel-of-interest, $z_1(x,y)$ to generate a second adjusted pixel value $z_2(x,y)$.

In at least one embodiment of 2D adaptive peaking with ringing control module 204, the second adjusted pixel value $z_2(x,y)$ is further processed to limit ringing in the image. In at least one embodiment, ringing control module 804 determines a maximum pixel value using max module 822 and a minimum pixel value using min module 824 over the entire window of adjusted luma values for the pixel-of-interest $z_1(x,y)$. Each of max module 822 and min module 824 performs a compare of the adjusted pixel value for the pixel-of-interest $z_1(x,y)$ to each original pixel value in the associated window to determine a minimum pixel value and a maximum pixel value. Then, in at least one embodiment, ringing control module 804 adjusts those extrema (i.e., the minimum and maximum pixel value) to allow some undershoot and overshoot, respectively, which may improve visual perception of the resulting image. For example, each of the extrema is gained by $2^{-n}$, where n is a programmable integer value (e.g., n=3) and combined with (e.g., added to or subtracted from) the original extrema value to generate the adjusted extrema (e.g., adjusted maximum or adjusted minimum, respectively). The second adjusted pixel value $z_2(x,y)$ is then compared to the adjusted extrema. If the second adjusted pixel value exceeds the adjusted maximum, the adjusted maximum is provided as the output adjusted pixel value $Y_{OUT}(x,y)$. If the second adjusted pixel value is less than the adjusted minimum, the adjusted minimum is provided as the output adjusted pixel value $Y_{OUT}(x,y)$. Referring back to FIGS. 1 and 2, in at least one embodiment of video SOC 102, the resulting processed pixel values, $Y_{OUT}(x,y)$ for the pixel-of-interest is buffered and then stored back to a corresponding location in memory 104.

Figure 8:
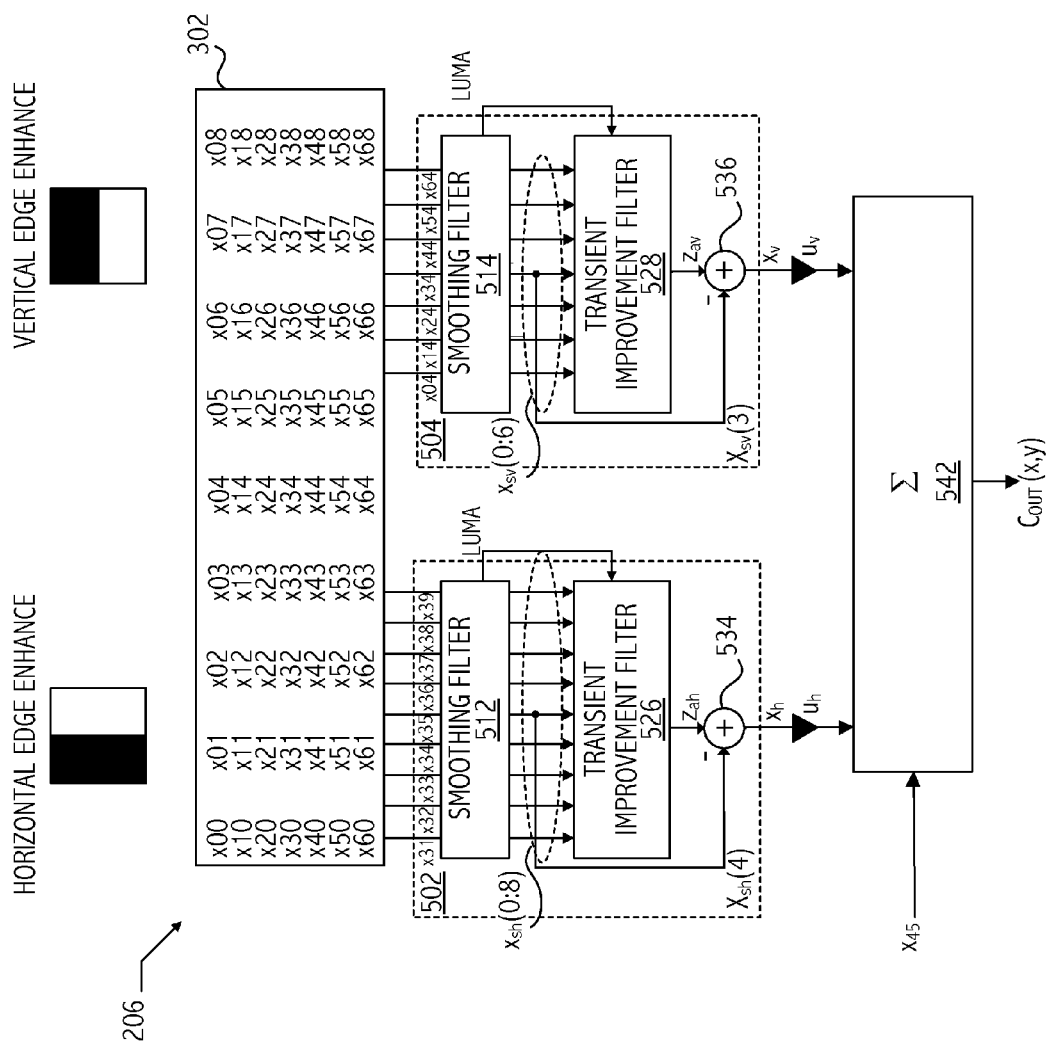
FIG. 8 illustrates a functional block diagram of a chroma component transient improvement module 206 of FIGS. 2A and 2B, consistent with at least one embodiment of the invention.

Referring back to FIGS. 2A and 2B, in at least one embodiment of adaptive enhancement module 200, chroma transient improvement module 206 performs a transient improvement process on chroma pixel values (e.g., each of $C_B$ and $C_R$) based on corresponding luma pixel values. Referring to FIG. 8, in at least one embodiment of chroma transient improvement module 208, a chroma component transient improvement module 206 is instantiated for each chroma component ($C_B$ and $C_R$). Referring to FIG. 8, in at least one embodiment of chroma component transient improvement module 206, each of two directional filter modules (e.g., horizontal edge enhance filter module 502 and vertical edge enhance filter module 506) determines a transient improvement value for a corresponding direction (e.g., horizontal or vertical) by applying a two-dimensional, non-linear filter to a particular pixel (i.e., a pixel-of-interest or current pixel). In at least one embodiment of transient improvement module 206, the horizontal edge enhance filter module 502 and vertical edge enhance filter module 506 includes a corresponding two-dimensional smoothing filter unit (e.g., 2D filter units 512 and 514, respectively) that generate corresponding smoothed pixel values ($x_{sh}$ and $x_{sv}$) based on a linear filtering of the pixel-of-interest. In at least one embodiment of transient improvement module 206, 2D filter units 512 and 514 implement the same filtering functions as 2D filter units 314 and 316, respectively, of FIG. 3.

In at least one embodiment of chroma component transient improvement module 206, each of the directional filter modules 502 and 504 generates a corresponding direction-specific transient improved chroma value ($z_{ah}$ and $z_{av}$) for the pixel-of-interest in the pixel window buffer 302 based on a non-linear filtering of the corresponding smoothed pixel value ($x_{sh}$ and $x_{sv}$, respectively) and a plurality of surrounding pixel values from the pixel window. For example, transient improvement filter 526 of horizontal edge enhance filter module 502 generates a transient improvement value $z_{ah}$ in a horizontal direction based on a non-linear filtering of [z(−4), z(−3), z(−2), z(−1), z(0), z(1), z(2), z(3), z(4)], which correspond to [$x_{sh0}$, $x_{sh1}$, $x_{sh2}$, $x_{sh3}$, $x_{sh4}$, $x_{sh5}$, $x_{sh6}$, $x_{sh7}$, $x_{sh8}$] and transient improvement filter 528 of vertical edge enhance filter module 504 generates a transient improvement value $TI_V$ based on a non-linear filtering of the pixel window in a vertical direction based on a non-linear filtering of [z(−3), z(−2), z(−1), z(0), z(1), z(2), z(3)], which correspond to [$x_{sv0}$, $x_{sv1}$, $x_{sv2}$, $x_{sv3}$, $x_{sv4}$, $x_{sv5}$, $x_{sv6}$]. Each of the transient-improved pixel values $z_{ah}$ and $z_{av}$, represents a sharpness-enhanced version of the pixel-of-interest in a corresponding one of the horizontal and vertical directions. Summation modules 534 and 536 sum the corresponding transient-improved pixel values $z_{ah}$ and $z_{av}$, with the smoothed version of the pixel-of-interest to isolate the direction-specific transient improvement value ($x_h$, and $x_v$, respectively). In at least one embodiment of chroma component transient improvement module 206, the direction-specific transient-adjusted values are gained to generate direction-specific transient improvement values $u_H$ and $u_V$, some or all of which are combined with the original pixel value initially associated with the pixel-of-interest to generate an enhanced pixel value for the pixel-of-interest. Then, this process may be repeated for the next pixel.

Referring to FIG. 9, in at least one embodiment, a chroma transient improvement filter module (e.g., a chroma component transient improvement filter 900, which may be transient improvement filter 528 and which may be adapted for transient improvement filter 526, which receives as input z(−4), z(−3), z(−2), z(−1), z(0), z(1), z(2), z(3), z(4)), includes a 2-D high-pass filter 904 that performs the same operation as high-pass filter 404 of FIG. 4 to generate a signal c(n)) that is indicative of the rate at which the chroma component values increase or decrease in the particular direction. In at least one embodiment, chroma transient improvement filter module 900 includes 2-D high-pass filter 906 that performs the same operation as high-pass filter 406 of FIG. 4 to generate a scalar signal (e.g., signal 907) indicative of the rate of change (i.e., the slope) of the chroma component values that are collinear in the particular direction.

In at least one embodiment, chroma component transient improvement module 206 generates a gain (e.g., $g_1$(n)) based on scalar 907, using module 908 and module 910, which implements the function of FIG. 10C. Modules 908 and 910 implement the same techniques and operations as modules 408 and 410 of FIG. 4 and FIG. 5B, described above, which determine a value for $g_1$(n) that increases high-frequency components without substantially enhancing noise.

In at least one embodiment, chroma component transient improvement filter 900 applies gain $g_1$(n) to c(n), e.g., using multiplier 912, to generate a direction-specific transient improvement value for the corresponding direction (e.g., improvement value a(n)). In at least one embodiment of chroma transient improvement filter module 900, a summing module (e.g., summer 916) sums a(n) with the original chroma component value (e.g., z(0)) to generate a direction-specific enhanced chroma component value for the pixel-of-interest (e.g., z(0)+a(n)=$z_e$(n)). In at least one embodiment of chroma component transient improvement filter 900, $z_e$(n) is output as the direction-specific edge-enhanced chroma component value for the pixel-of-interest. However, in at least one embodiment of chroma component transient improvement filter 900, shoot suppression module 922 further processes $z_e$(n) to reduce effects of overshoot/undershoot, consistent with the techniques describe above with regard to shoot suppression module 422.

In general, since chroma components $C_b$ and $C_r$ are highly compressed and tend to be noisy signals, edges are more difficult to detect in $C_b$ and $C_r$ signals. In addition, changes in chroma tend to be more noticeable when accompanied by a change in luminance. Therefore, to reduce noise artifacts, edge enhancement of the chroma components are realized only when an edge is detected in a corresponding luma value for the pixel-of-interest. In at least one embodiment, chroma component transient improvement filter 900, a gain value (k) is generated by the control path of FIG. 10B. For example, in at least one embodiment of chroma component transient improvement filter 900, a luma pixel value of the pixel-of-interest is high-pass filtered to detect an edge. The absolute value of the filtered luma value is then limited to a value less than or equal to one by the function of FIG. 10A. If the absolute value of the filtered luma value is greater than one, k is limited to one. The strength of an edge detected in the luma value is indicated by k and a weight corresponding to the original chroma value is generated by subtracting k from one. Accordingly, the edge enhanced value of the chroma component value for the pixel-of-interest and the original chroma component value for the pixel-of-interest are weighted and combined to generate an output chroma component $z_{TI}$.

Referring back to FIG. 8, for a particular chroma component, each of the transient-improved pixel values $z_{ah}$ and $z_{av}$ represents a sharpness-enhanced version of the pixel-of-interest in a corresponding one of the horizontal and vertical, directions. Summation modules 534 and 536 sum the corresponding transient-improved pixel values $z_{ah}$ and $z_{av}$ with a smoothed version of the chroma component of the pixel-of-interest $x_{sh}$ and $x_{sv}$, respectively, filtered with respect to the corresponding direction to isolate the direction-specific transient improvement value ($x_h$ and $x_v$). In at least one embodiment of chroma component transient improvement module 206, the direction-specific transient improvement values are gained to generate direction-specific transient improvement values $u_h$ and $u_v$, one or both of which are combined with the original pixel value initially associated with the pixel-of-interest (e.g., using summing module 542) to generate an edge-enhanced pixel value for the pixel-of-interest ($C_{OUT}$, which is $C_{BOUT}$ or $C_{ROUT}$ of FIGS. 2A and 2B). Then, this process may be repeated for the next pixel to be edge-enhanced. Referring back to FIGS. 1 and 2, in at least one embodiment of video SOC 102, the resulting processed pixel values, $C_{BOUT}$(x,y) and $C_{ROUT}$(x,y) for the pixel-of-interest are buffered and then stored back to a corresponding location in memory 104.

Structures described herein may be implemented using software (which includes firmware) executing on a processor included in video processing unit 108 or 110, or by a combination of software and hardware. Software, as described herein, may be encoded in at least one tangible computer readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which chroma components are processed with respect to horizontal and vertical directions, one of skill in the art will appreciate that the teachings herein can be utilized with only processing of luma pixel values or with transient improvement of edges with respect to other combinations of orientations. In addition, while the invention has been described in an embodiment in which a particular window size and symmetry is used, one of skill in the art will appreciate that the teachings herein can be utilized with other window sizes and symmetries. Further, although video system 100 includes application of 2-D adaptive peaking with ringing control module 204 to luminance values, other embodiments of video system 100 (FIG. 2B) apply 2-D adaptive peaking with ringing control module 204 to chrominance component value(s) $C_{BOUT}$ and/or $C_{ROUT}$ consistent with techniques described herein. Variations and modifications of the embodiments disclosed herein, may be made based on the description set forth herein, without departing from the scope and spirit of the invention as set forth in the following claims.

What is claimed is:

1. An apparatus for adaptive edge enhancement of a video signal comprising:
a transient improvement module configured to generate a first adjusted pixel value based on a window of pixel values for pixels surrounding a pixel-of-interest initially having an input pixel value;
an adaptive peaking module configured to generate a second adjusted pixel value based on an adaptive adjustment value, the first adjusted pixel value, and the input pixel value, the adaptive peaking module comprising a gain path configured to apply at least one adaptive gain value to a pixel adjustment to generate the adaptive adjustment value; and
a control path configured to generate the at least one adaptive gain value, the control path comprising:
a two-dimensional low-pass filter configured to generate a low-pass filtered version of the first adjusted pixel value;
at least one two-dimensional high-pass filter configured to amplify an edge in the low-pass filtered version of the first adjusted pixel value in at least a first direction, wherein the at least one adaptive gain value is based on at least one corresponding output of the at least one two-dimensional high-pass filter.

2. The apparatus, as recited in claim 1, wherein the adaptive peaking module further comprises a high-pass filter configured to generate the pixel adjustment based on the first adjusted pixel value.

3. The apparatus, as recited in claim 1, wherein the control path further comprises:
a gain control module configured to provide a first adaptive gain value based on a strength of the low-pass filtered input pixel;
wherein the at least one two-dimensional high-pass filter comprises:
a first two-dimensional high-pass filter configured to amplify an edge in a horizontal direction in an output of the two-dimensional low-pass filter;
a second two-dimensional high-pass filter configured to amplify an edge in a vertical direction in the output of the two-dimensional low-pass filter;
wherein a second adaptive gain value is based on outputs of the first and second two-dimensional high-pass filters.

4. The apparatus, as recited in claim 2, wherein the adaptive peaking module further comprises a summing module configured to combine the adaptive adjustment value with the first adjusted pixel value to generate the second adjusted pixel value.

5. The apparatus, as recited in claim 1, further comprising:
a ringing control module configured to generate an output adjusted pixel value based on the second adjusted pixel value, the output adjusted pixel value being within a range based on a minimum pixel value and a maximum pixel value.

6. The apparatus, as recited in claim 1, wherein the transient improvement module is a luminance transient improvement module, and the apparatus further comprises:
a chrominance transient improvement module configured to generate at least one adjusted chrominance pixel value based on a window of chrominance pixel values including an input chrominance value of the pixel-of-interest, and the input pixel value is a corresponding luminance value.

7. The apparatus, as recited in claim 1, wherein the transient improvement module combines adjustments corresponding to a plurality of a horizontal direction, a vertical direction, +45 degree diagonal direction, and a −45 degree diagonal direction with the input pixel value to generate the first adjusted pixel value.

8. An apparatus for adaptive edge enhancement of a video signal comprising:
a luminance transient improvement module configured to generate a first adjusted pixel value based on a window of pixel values for pixels surrounding a pixel-of-interest initially having an input pixel value;
an adaptive peaking module configured to generate a second adjusted pixel value based on an adaptive adjustment value, the first adjusted pixel value, and the input pixel value; and
a chrominance transient improvement module configured to generate at least one adjusted chrominance pixel value based on a window of chrominance pixel values including an input chrominance value of the pixel-of-interest, and the input pixel value is a corresponding luminance value,
wherein at least one of the luminance transient improvement module and the chrominance transient improvement module further comprises a shoot suppression module, wherein the shoot suppression module is configured to select a maximum adjusted pixel value as the first adjusted pixel value when a transient-adjusted pixel value is greater than the maximum adjusted pixel value, wherein the shoot suppression module is configured to select a minimum adjusted pixel value as the first adjusted pixel value when the transient-adjusted pixel value is less than the minimum adjusted pixel value; and wherein the shoot suppression module is configured to select the transient-adjusted pixel value as the first adjusted pixel value when the transient-adjusted pixel value is less than or equal to the maximum adjusted pixel value and the transient-adjusted pixel value is greater than or equal to the minimum adjusted pixel value.

9. An apparatus for adaptive edge enhancement of a video signal comprising:

a transient improvement module configured to generate a first adjusted pixel value based on a window of pixel values for pixels surrounding a pixel-of-interest initially having an input pixel value; and an adaptive peaking module configured to generate a second adjusted pixel value based on an adaptive adjustment value, the first adjusted pixel value, and the input pixel value, wherein the transient improvement module is configured to combine a first approximation value for collinear pixel values for pixels collinear in a first direction, a second approximation value for the collinear pixels, and a gain control value based on an average luminance value of the pixel values to generate an adjustment value, wherein the first adjusted pixel value is further based on the adjustment value.

10. The apparatus, as recited in claim 9, further comprising a control path configured to generate the adaptive adjustment value, the control path comprising:

a two-dimensional low-pass filter configured to generate a low-pass filtered version of the first adjusted pixel value;

at least one two-dimensional high-pass filter configured to amplify an edge in the low-pass filtered version of the first adjusted pixel value in at least a first direction, wherein the adaptive adjustment value is based on at least one corresponding output of the at least one two-dimensional high-pass filter.

11. The apparatus, as recited in claim 9, wherein the transient improvement module combines adjustments corresponding to a horizontal direction, a vertical direction, +45 degree diagonal direction, and a −45 degree diagonal direction with the input pixel value to generate the first adjusted pixel value.

12. A method for edge-enhancement of a video signal comprising:

generating a transient-adjusted pixel value for a pixel-of-interest based on a window of pixel values for pixels surrounding the pixel-of-interest, the pixel-of-interest initially having an input pixel value;

generating an output adjusted pixel value for the pixel-of-interest based on at least one adaptive gain value, a high-pass filter of the window of pixel values, and the transient-adjusted pixel value;

low-pass filtering a second window of pixel values of pixels surrounding the pixel-of-interest and the transient-adjusted pixel value; and generating the at least one adaptive gain value based on an output of the low-pass filtering.

13. The method, as recited in claim 12, wherein generating the output adjusted pixel value comprises reducing effects of ringing introduced by a linear unsharp mask filter.

14. The method, as recited in claim 12, wherein generating the output adjusted pixel value comprises providing as the output adjusted pixel value an upper limit for the output adjusted pixel value or a lower limit for the output adjusted pixel value when an adjusted version of the transient-adjusted pixel value is outside a range of pixel values, the range of pixel values being defined by the upper limit and the lower limit, the upper limit and the lower limit being based on the window of pixels and the transient-adjusted pixel value.

15. The method, as recited in claim 12, wherein the at least one adaptive gain value is configured to limit a rate of change of the output adjusted pixel value.

16. The method, as recited in claim 12, wherein the transient-adjusted pixel value is a transient-adjusted luminance value and the input pixel value is a luminance pixel value and the method further comprises:

generating a transient-adjusted chrominance value based on the luminance pixel value.

17. The method, as recited in claim 12, wherein the transient-adjusted pixel value is a transient-adjusted chrominance value and the input pixel value is a chrominance pixel value.

18. The method, as recited in claim 12, wherein the transient-adjusted value is based on a plurality of adjustment values with respect to at least one of a horizontal direction, a vertical direction, a +45 degree diagonal direction, or a −45 degree diagonal direction.

19. The method, as recited in claim 18, wherein generating the transient-adjusted pixel value comprises:

combining adjustments corresponding to a plurality of a horizontal direction, a vertical direction, a +45 degree diagonal direction, and a −45 degree diagonal direction with the input pixel value to generate the transient-adjusted pixel value.

20. A method for edge-enhancement of a video signal comprising:

generating a transient-adjusted pixel value for a pixel-of-interest based on a window of pixel values for pixels surrounding the pixel-of-interest, the pixel-of-interest initially having an input pixel value; and generating an output adjusted pixel value for the pixel-of-interest based on at least one adaptive gain value, a high-pass filter of the window of pixel values, and the transient-adjusted pixel value, wherein generating the transient-adjusted pixel value comprises:

selecting a maximum transient-adjusted value as the transient-adjusted pixel value when a first transient-adjusted pixel value is greater than the maximum transient-adjusted pixel value;

selecting a minimum transient-adjusted value as the transient-adjusted pixel value when the first transient-adjusted pixel value is less than the minimum adjusted pixel value; and selecting the first transient-adjusted pixel value as the transient-adjusted pixel value when the first transient-adjusted pixel value is less than or equal to the maximum transient-adjusted pixel value and the first transient-adjusted pixel value is greater than or equal to the minimum adjusted pixel value.

21. The method, as recited in claim 20, further comprising:

low-pass filtering a second window of pixel values of pixels surrounding the pixel-of-interest and the transient-adjusted pixel value; and generating the at least one adaptive gain value based on an output of the low-pass filtering.

22. A method for edge-enhancement of a video signal comprising:

generating a transient-adjusted pixel value for a pixel-of-interest based on a window of pixel values for pixels surrounding the pixel-of-interest, the pixel-of-interest initially having an input pixel value;

generating an output adjusted pixel value for the pixel-of-interest based on at least one adaptive gain value, a high-pass filter of the window of pixel values, and the transient-adjusted pixel value; and generating the transient-adjusted pixel value based on a first approximation value for collinear pixel values for pixels collinear in a first direction, a second approximation value for the collinear pixel values, and a gain control value based on an average luminance value.

23. The method, as recited in claim 22, further comprising:
generating the at least one adaptive gain value comprising:
low-pass filtering a second window of pixel values of pixels surrounding the pixel-of-interest and the transient-adjusted pixel value; two-dimensional high-pass filtering the output of the low-pass filtering to generate a first gain value, the two-dimensional high-pass filtering amplifying any edge in a first direction; two-dimensional high-pass filtering the output of the low-pass filtering to generate a second gain value, the two-dimensional high-pass filtering amplifying any edge in a second direction, the second direction being different from the first direction; and generating the at least one adaptive gain based on the first and second gain value.

24. An apparatus for adaptive edge enhancement of a video signal comprising:
a first chrominance transient adjustment module configured to generate a first adjusted chrominance value based on a window of chrominance values of pixels surrounding a pixel-of-interest having an input chrominance value and an input luminance value;
a first control module configured to generate an output adjusted chrominance value for the pixel-of-interest based on the first adjusted chrominance value, the input chrominance value, and the input luminance value,
wherein the first chrominance transient adjustment module comprises:
a shoot suppression circuit configured to select a maximum adjusted chrominance value as the first adjusted chrominance value when a transient-adjusted chrominance value is greater than the maximum adjusted chrominance value,
wherein the shoot suppression module is further configured to select a minimum adjusted chrominance value as the first adjusted chrominance value when the transient-adjusted chrominance value is less than the minimum adjusted chrominance value; and
wherein the shoot suppression module is further configured to select the transient-adjusted chrominance value as the first adjusted chrominance value when the transient-adjusted chrominance value is less than or equal to the maximum adjusted chrominance value and the transient-adjusted chrominance value is greater than or equal to the minimum adjusted chrominance value.

25. The apparatus, as recited in claim 24, wherein the first control module comprises:
a summing module configured to sum a version of the output of the shoot suppression circuit gained by a first gain and a version of the input chrominance value filtered and gained by a second gain to generate the output adjusted chrominance value.

26. The apparatus, as recited in claim 25, wherein the first gain is a likelihood that the corresponding luminance value of the pixel is associated with an edge and the second gain is a likelihood that the corresponding luminance value of the pixel is not associated with an edge.

27. An apparatus for adaptive edge enhancement of a video signal comprising:
a first chrominance transient adjustment module configured to generate a first adjusted chrominance value based on a window of chrominance values of pixels surrounding a pixel-of-interest having an input chrominance value and an input luminance value;
a first control module configured to generate an output adjusted chrominance value for the pixel-of-interest based on the first adjusted chrominance value, the input chrominance value, and the input luminance value;
an additional chrominance transient adjustment module configured to generate a second adjusted chrominance value based on the window of chrominance values of pixels and a direction different from a direction associated with the chrominance transient adjustment module;
an additional control module configured to generate a second output chrominance pixel value based on the second adjusted chrominance value, the input chrominance value, and the input luminance value; and
a combining module configured to combine adjustments based on the first adjusted chrominance value and the second adjusted chrominance value to generate an output chrominance value,
wherein the first and second chrominance transient adjustment modules generate first and second adjusted chrominance values based on adjustments for enhancing horizontal and vertical edges, respectively.

28. The apparatus, as recited in claim 27, wherein the first chrominance transient adjustment module comprises:
a shoot suppression circuit configured to select a maximum adjusted chrominance value as the first adjusted chrominance value when a transient-adjusted chrominance value is greater than the maximum adjusted chrominance value,
wherein the shoot suppression module is further configured to select a minimum adjusted chrominance value as the first adjusted chrominance value when the transient-adjusted chrominance value is less than the minimum adjusted chrominance value; and
wherein the shoot suppression module is further configured to select the transient-adjusted chrominance value as the first adjusted chrominance value when the transient-adjusted chrominance value is less than or equal to the maximum adjusted chrominance value and the transient-adjusted chrominance value is greater than or equal to the minimum adjusted chrominance value.

* * * * *